(12) United States Patent
Xu et al.

(10) Patent No.: US 8,978,239 B2
(45) Date of Patent: Mar. 17, 2015

(54) FIELD COIL WINDING ASSEMBLY

(71) Applicant: General Electric Company, Schenectady, NY (US)

(72) Inventors: James Jun Xu, Niskayuna, NY (US); Stephen Frank Francese, Ballston Spa, NY (US); Alan Michael Iversen, Clifton Park, NY (US); Leonard Paul Squillacioti, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 13/737,356

(22) Filed: Jan. 9, 2013

(65) Prior Publication Data
US 2014/0190002 A1 Jul. 10, 2014

(51) Int. Cl.
*H02K 15/02* (2006.01)
*H02K 15/10* (2006.01)
*H02K 3/30* (2006.01)
*H02K 3/34* (2006.01)
*H02K 15/12* (2006.01)

(52) U.S. Cl.
CPC .................. *H02K 15/10* (2013.01); *H02K 3/30* (2013.01); *H02K 3/34* (2013.01); *H02K 15/12* (2013.01)
USPC .............. 29/598; 29/596; 29/605; 29/606

(58) Field of Classification Search
CPC ........ H01L 24/11; H01M 4/04; H01F 41/041; H01F 2027/2814; Y10S 310/06; H05K 3/4608
USPC ........... 29/598, 596, 605, 606, 732, 734; 310/58, 59, 61, 89, 91, 179, 195, 214

See application file for complete search history.

(56) References Cited

U.S. PATENT DOCUMENTS

| | | | |
|---|---|---|---|
| 3,866,070 A | * | 2/1975 | Madsen ..................... 310/214 |
| 4,333,027 A | | 6/1982 | Madsen |
| 4,667,125 A | | 5/1987 | Kaminski et al. |
| 4,739,207 A | * | 4/1988 | Ying et al. .................... 310/214 |
| 5,065,064 A | | 11/1991 | Kaminski |
| 5,245,495 A | | 9/1993 | Bailey et al. |

(Continued)

OTHER PUBLICATIONS

Zhang et al., "Silicone Based Electrical Insulation Material for High Speed/Voltage Rotating Machines," May 2011, 8 pages, ARLON Silicone Technologies Division.

(Continued)

*Primary Examiner* — Thiem Phan
(74) *Attorney, Agent, or Firm* — Ernest G. Cusick; Hoffman Warnick LLC

(57) ABSTRACT

A method for preparing a field coil winding assembly including cleaning a plurality of copper coils followed by developing, after the cleaning, a copper oxide layer on each of the copper coils by oxidizing each of the copper coils in a solution. After the developing, each of the copper coils is rinsed followed by drying. After the drying, a turn insulation system is applied to each of the copper coils. The turn insulation system includes a turn insulation and an adhesive. The turn insulation includes at least one of a glass fiber re-enforced polyamideimide, a glass fiber re-enforced polyester, or a glass fiber re-enforced high temperature novolac epoxy. After the applying, each of the copper coils with the turn insulation system is cured. The plurality of copper coils with the turn insulation system are stacked in each of a plurality of rotor slots in a rotor.

20 Claims, 3 Drawing Sheets

(56) References Cited

U.S. PATENT DOCUMENTS

| | | |
|---|---|---|
| 5,315,158 A | 5/1994 | Danielson |
| 5,329,197 A | 7/1994 | Kudlacik |
| 5,349,257 A | 9/1994 | Hernden |
| 5,387,859 A | 2/1995 | Murugan et al. |
| 5,418,675 A | 5/1995 | Bodenheimer et al. |
| 5,528,444 A | 6/1996 | Cooke et al. |
| 5,528,445 A | 6/1996 | Cooke et al. |
| 5,583,420 A | 12/1996 | Rice et al. |
| 5,617,011 A | 4/1997 | Hammer et al. |
| 5,691,058 A | 11/1997 | Miyao et al. |
| 5,709,103 A | 1/1998 | Williams |
| 5,753,987 A | 5/1998 | Shepherd et al. |
| 5,801,516 A | 9/1998 | Rice et al. |
| 5,886,434 A | 3/1999 | Nygard |
| 5,903,130 A | 5/1999 | Rice et al. |
| 5,929,610 A | 7/1999 | Friedlander et al. |
| 6,003,304 A | 12/1999 | Swanson et al. |
| 6,107,775 A | 8/2000 | Rice et al. |
| 6,188,203 B1 | 2/2001 | Rice et al. |
| 6,225,790 B1 | 5/2001 | Harmon |
| 6,362,545 B1 | 3/2002 | Prole et al. |
| 6,528,973 B2 | 3/2003 | Fury |
| 6,798,210 B2 | 9/2004 | Goodrich et al. |
| 6,882,173 B1 | 4/2005 | Nelson et al. |
| 6,910,332 B2 | 6/2005 | Fellows |
| 6,911,838 B2 | 6/2005 | Rao et al. |
| 6,914,093 B2 | 7/2005 | Xu |
| 6,952,070 B1 | 10/2005 | Kaminski et al. |
| 6,956,313 B2 | 10/2005 | El-Gabry et al. |
| 7,002,278 B2 | 2/2006 | Verbanic et al. |
| 7,015,616 B2 | 3/2006 | Doherty et al. |
| 7,184,866 B2 | 2/2007 | Squires et al. |
| 7,205,678 B2 | 4/2007 | Casazza et al. |
| 7,227,289 B2 | 6/2007 | Gardner et al. |
| 7,272,514 B2 | 9/2007 | Qi et al. |
| 7,311,971 B2 | 12/2007 | Markovitz et al. |
| 7,339,283 B2 | 3/2008 | Gvelesiani |
| 7,385,305 B2 | 6/2008 | Casazza et al. |
| 7,385,306 B2 | 6/2008 | Casazza et al. |
| 7,392,122 B2 | 6/2008 | Pillar et al. |
| 7,402,968 B2 | 7/2008 | Wada et al. |
| 7,423,854 B2 | 9/2008 | Gandolfi et al. |
| 7,480,977 B2 | 1/2009 | Smigelski |
| 7,486,053 B2 | 2/2009 | Qi et al. |
| 7,511,392 B2 | 3/2009 | Rubbo et al. |
| 7,592,784 B2 | 9/2009 | Qi et al. |
| 7,623,329 B2 | 11/2009 | Williams et al. |
| 7,633,259 B2 | 12/2009 | Fish |
| 7,661,271 B1 | 2/2010 | Millsaps, Jr. |
| 7,687,932 B2 | 3/2010 | Casazza et al. |
| 7,751,161 B2 | 7/2010 | Williams |
| 7,755,230 B2 | 7/2010 | Nakahara et al. |
| 7,756,621 B2 | 7/2010 | Pillar et al. |
| 7,792,618 B2 | 9/2010 | Quigley et al. |
| 7,893,555 B2 | 2/2011 | Casazza et al. |
| 7,936,542 B2 | 5/2011 | Lowther |
| 7,973,122 B2 | 7/2011 | Xu |
| 8,064,174 B2 | 11/2011 | Williams et al. |
| 8,098,054 B2 | 1/2012 | Verschuur |
| 2010/0096944 A1 | 4/2010 | Sivasubramaniam et al. |

OTHER PUBLICATIONS

ASTM International, "Standard Test Method for Decomposition Kinetics by Thermogravimetry," Designation: E 1641-04, 2004, pp. 559-565.

ASTM International, "Standard Practice for Calculating Thermal Endurance of Materials from Thermogravimetric Decomposition Data," Designation: E 1877-00, 2005, pp. 617-620.

* cited by examiner

FIELD COIL WINDING ASSEMBLY

FIELD OF THE INVENTION

This invention relates generally to field assembly of a dynamoelectric machine and more particularly to field coil winding assemblies.

BACKGROUND OF THE INVENTION

Conventional dynamoelectric machines, such as generators used with gas and steam turbines, employ a rotor or a field into which rotor slots are machined. In a field coil winding assembly, the rotor slots receive conductive turns of field windings made of stacks of copper coils which are interconnected as to produce a desired magnetic flux pattern. The copper coils are stacked between slot cell insulation in the rotor slots. A wedge is used at the open end of the rotor slot to hold the stack of copper coils in place. In the field coil winding assembly, a turn insulation system consisting of turn insulation and adhesive are used between copper coils to provide both mechanical and electrical separations of the copper coils. An adhesive is placed on one side of a copper coil or turn insulation and the turn insulation is attached to the copper coil using the adhesive. The copper coils and turn insulation system may have registered ventilation openings or radial ducts that are aligned allowing cooling gas, for example air or hydrogen, to flow through the stacks of copper coils.

Significant thermal, mechanical, and other stresses are exerted on slot winding insulations and turn insulation systems even though ventilation paths may be imbedded within and through the copper coils. Temperatures of up to 155° C. are possible in some generators. Centrifugal compressive forces may be as high as 12,000 psi for a 60 Hz electric machine whose rotor spins at 3600 rpm. Thermal and mechanical stresses may induce degradation of turn insulation systems. It may weaken certain locales of turn insulation systems where morphological defects and air pockets may be present. Subsequently, it may cause turn shorts between the copper coils whose appearance is seemingly caused by an electrical breakdown of the turn insulation system. The presence of an electric field across the turn insulation may aggravate the risk of turn shorts, but the effect is minimal as the field strength across the turn insulation system is no more than 100V/mil, and more particularly, the field is no more than 70V/mil for some hydrogen cooled generators. Furthermore, radial vibration of the copper coils of a few microns may be caused by turn shorts, induced field sensitivity, imbalanced inductance, and thermal expansion. In addition, axial movement of the turn insulation, a migration of the turn insulation due to the loss of adhesion between the turn insulation and the copper coils, may induce blockage of the radial ducts causing thermal stress degradation resulting in a negative feedback cycle.

Turn shorts and turn insulation migration may be of concern for generators which may be associated with gradual loss of the adhesion as well as inadequate thermal resistance of the turn insulation system. Loss of the adhesion may be due to manufacturing and/or the type of adhesive chemistry and/or aging. The adhesion capability may be inversely proportional to the thermal capability of the adhesive. The adhesive chemistry limits the choice of adhesive for turn insulation user in large dynamoelectric machines of several hundred megawatts. Further, the adhesive chemistry is not conducive to the environment where the thermal stress is dominant. In addition, there is no rapid, controlled, and affordable manufacturing method that enhances the mechanical integrity of field coil winding assemblies with a robust feature of reduced risks of turn shorts and turn migration. Blasting each coil to form a controlled and desirable surface profile is laborious and costly. Forming a copper oxide layer in room temperature or hot air may be time and space-consuming, possibly inhomogeneous, and impractical. Putting a copper adhesion promoter in the adhesive has been costly and its effect on uniformity is not guaranteed.

BRIEF DESCRIPTION OF THE INVENTION

A first aspect of the disclosure provides a method, comprising: preparing a field coil winding assembly including cleaning a plurality of copper coils; developing, after the cleaning, a copper oxide layer on each of the copper coils by oxidizing each of the copper coils in a solution; rinsing, after the developing, each of the copper coils; drying, after the rinsing, each of the copper coils; applying, after the drying, a turn insulation system to each of the copper coils, wherein the turn insulation system includes a turn insulation and an adhesive, wherein the turn insulation includes at least one of a glass fiber re-enforced polyamideimide, a glass fiber re-enforced polyester, or a glass fiber re-enforced high temperature novolac epoxy; curing, after the applying, each of the copper coils with the turn insulation system; and stacking the plurality of copper coils with the turn insulation system in each of a plurality of rotor slots in a rotor.

A second aspect of the disclosure provides a method, comprising: cleaning a plurality of copper coils; developing, after the cleaning, a copper oxide layer on the copper coils by oxidizing the copper coils in a solution; rinsing, after the developing, the copper coils; drying, after the rinsing, the copper coils; applying, after the drying, a turn insulation system to the copper coils, wherein the turn insulation system includes a turn insulation and an adhesive; and curing, after the applying, the copper coils with the turn insulation system.

A third aspect of the disclosure provides a field coil winding assembly, comprising: a rotor including a plurality of rotor slots; a plurality of copper coils stacked in each rotor slot; and a plurality of turn insulation systems, each turn insulation system provided between two of the copper coils and adhered to at least one of the two copper coils, wherein the turn insulation system includes a turn insulation and an adhesive, and wherein the turn insulation includes at least one of a glass fiber re-enforced polyamideimide, a glass fiber re-enforced polyester, or a glass fiber re-enforced high temperature novolac epoxy.

These and other aspects, advantages and salient features of the invention will become apparent from the following detailed description, which, when taken in conjunction with the annexed drawings, where the like parts are designated by the like reference characters throughout the drawings, disclose embodiments of the invention.

BRIEF DESCRIPTION OF THE DRAWINGS

The above and other aspects, features and advantages of the invention will be better understood by reading the following more particular description of the invention in conjunction with the accompanying drawings.

DETAILED DESCRIPTION OF THE INVENTION

Figure 1:
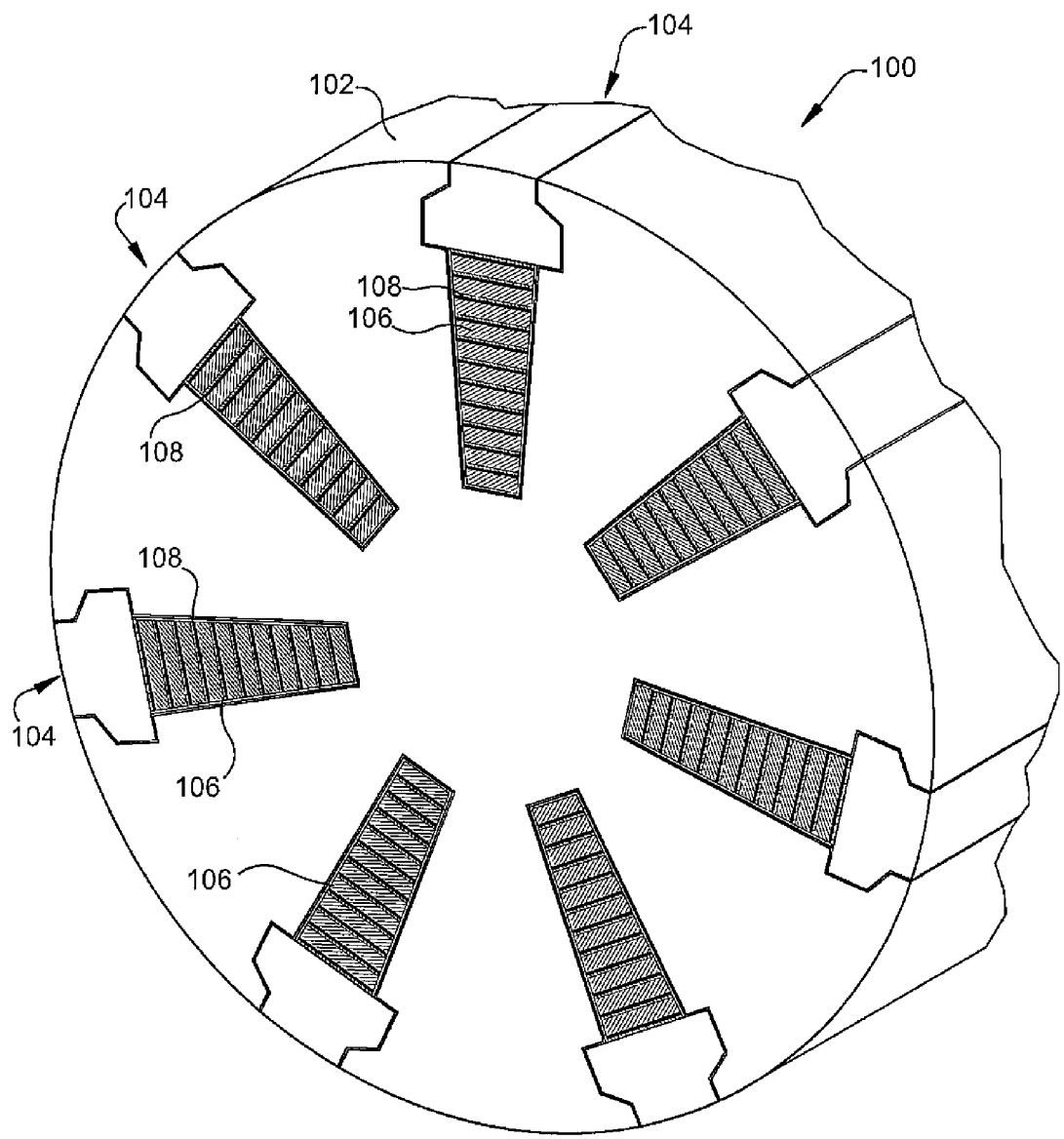
FIG. 1 shows a perspective view of one embodiment of a rotor in accordance with the present invention.
Figure 2:
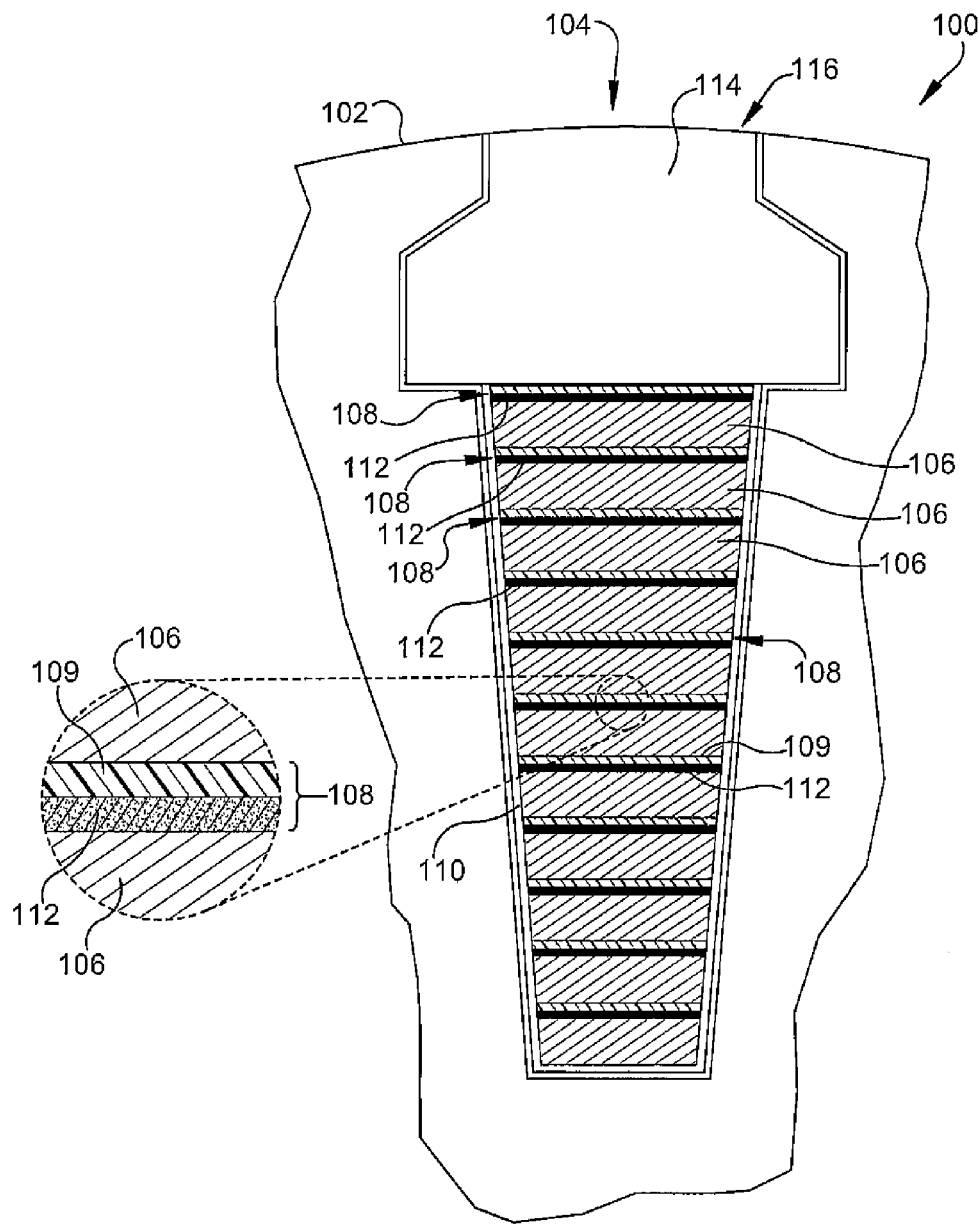
FIG. 2 shows a cross-sectional view of a one embodiment of a rotor slot in accordance with the present invention.

Referring to FIG. 1, a field coil winding assembly 100 may include a rotor 102 employed as part of a conventional dynamoelectric machine (not shown), such as a generator that may be used with a gas turbine or a steam turbine. Rotor 102 may include a plurality of rotor slots 104. Each rotor slot 104 may be stacked with copper coils 106 and turn insulation systems 108 as shown in FIG. 2 and described herein. Each turn insulation system may include a turn insulation 109 and an adhesive 112. Referring to FIG. 2, a cross-sectional view of one of the plurality of rotor slots 104 is shown. A plurality of copper coils 106 may be stacked in rotor slot 104. Rotor slot 104 may be lined with a slot cell insulation (or slot armor) 110 such as, but not limited to, a high heat resistant epoxy-glass laminate (whose glass transition temperature—a measure of degree of epoxy resin cure—is at least 160° C.). A plurality of turn insulation systems 108 may be deployed between the copper coils 106, by adhering with the adhesive 112 one of a plurality of turn insulations 109 to one of the plurality of copper coils 106 resulting in each turn insulation system 108 being deployed between two of the copper coils 106. Each turn insulation 108 may be adhered to at least one of the two copper coils 106 using the adhesive 112. Adhesive 112 may include at least one of a one part Bisphenol-A-based epoxy, a polyamideimide, a polyester, or a high temperature novolac epoxy. The use of one part Bisphenol-A-based epoxy, polyamideimide, polyester, or high temperature novolac epoxy for adhering turn insulation 109 to copper coils 106 is achieved by the method or methods described herein. A wedge 114 may be inserted at an open end 116 of the rotor slot 104.

Figure 3:
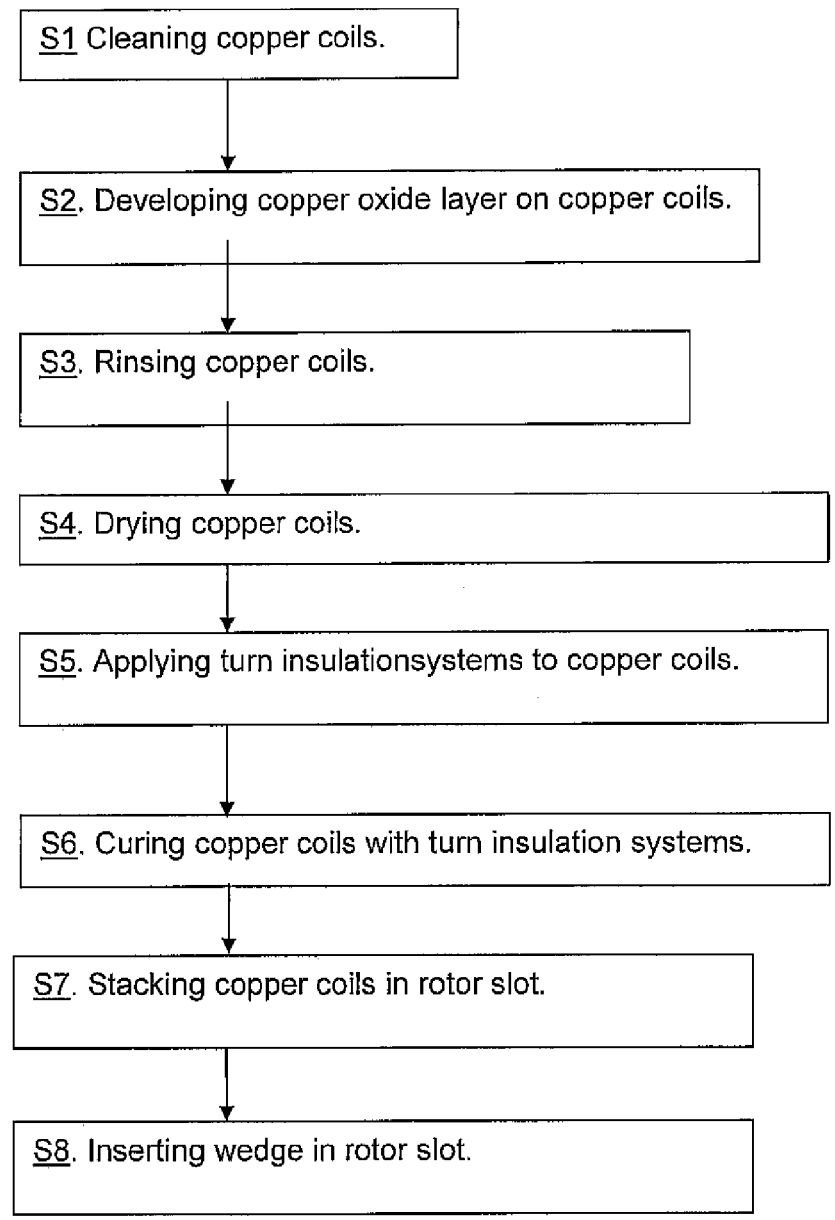
FIG. 3 shows a flow diagram of one embodiment of a process for preparing a field coil winding assembly in accordance with the present invention.

Referring to FIG. 3, a flow diagram of a method in one embodiment of the invention is shown. As shown in FIG. 3, at S1, a copper coil 106 may be cleaned. Cleaning may remove oil, grease, dust, and other contaminants from the copper coil 106. The cleaning may be performed using an alkaline detergent or any other suitable method for removing oil, grease, dust, and other contaminants from the copper coil 106.

At S2, after the cleaning, a copper oxide layer may be developed on the copper coil 106 by oxidizing the copper coil 106 in a solution. The solution may include one of sodium chlorite, sodium hydroxide, trisodium phosphate, and deionized water. The solution of sodium chlorite may have a concentration in a liter of deionized water of about 30 grams/liter. The solution of sodium hydroxide may have a concentration in a liter of deionized water of about 10 grams/liter. The solution of trisodium phosphate may have a concentration in a liter of deionized water of about 5 grams/liter. The solution of deionized water may have about 1000 grams or 1 liter. A duration of the developing may be a period of time of about 4 minutes to about 45 minutes with a preferred range of about 15 minutes to about 30 minutes. A solution temperature of the solution may be in range of about 45° C. to about 70° C. with a preferred range of about 50° C. to about 60° C. The developing may result in a thickness of the copper oxide layer in a range of about 150 nm to about 5 microns and, more specifically, in the range of about 170 nm to 310 nm when the developing is at about 50° C. for about 30 minutes and about 45 minutes respectively.

At S3, after the developing, the copper coil 106 is rinsed. The rinsing may include rinsing with water followed by rinsing with deionized water. The water may have a water temperature of about 25° C. to about 50° C. At S4, after the rinsing, the copper coil 106 may be dried using any suitable method for drying the copper coil 106, for example, hot air blowing.

At S5, after the drying, turn insulation system 108 is applied to one side of the copper coil 106. The applying of the turn insulation system 108 to one side of the copper coil 106 may include applying the turn insulation 109 with the adhesive 112. The adhesive 112 may be brushed on, impregnated to, or applied in any other suitable method to turn insulation 109 or the copper coil 106. The adhesive 112 may have a temperature index of at least 130° C.-155° C. when extrapolated about 20,000 hours with a preferred temperature of 155° C. The adhesive 112 may have a degradation temperature of about 300° C. when losing 5% of adhesive weight. Generally, adhesives 112 with these characteristics will be apparent to a person possessing ordinary skill in the art. The adhesive 112 may include a high heat resistant epoxy adhesive. The adhesive 112 may include at least one of a one part Bisphenol-A-based epoxy, a polyamideimide, a polyester, or a high temperature novolac epoxy. The turn insulation 108 may include at least one of a glass fiber re-enforced novolac epoxy, a glass fiber re-enforced polyamideimide, a glass fiber re-enforced polyester, or a glass fiber re-enforced high temperature epoxy. The glass fiber re-enforced novolac epoxy may have a glass transition temperature of at least 160° C., and can be as high as 200° C. post curing. The turn insulation 108 may have a temperature index of about 280-240° C. when extrapolated about 20,000 hours. The turn insulation 108 may have a degradation temperature of at least 330° C. when losing 5% of turn insulation weight. Generally, turn insulation 108 with these characteristics will be apparent to a person possessing ordinary skill in the art. The turn insulation 108 may have a thickness of about 10 mils to about 14 mils.

At S6, after the applying, the copper coil 106 with the turn insulation 108 and the adhesive 112 cured. A person skilled in the art will readily recognize that different adhesives 112 may be cured at a variety of temperatures over a range of time periods. For one part Bisphenol-A-based epoxy, the preferred curing may be at a cure temperature of about 90° C. to about 120° C. for not less than about 4 hours. For polyamideimide, the preferred curing may be at a cure temperature of about 180° C. to about 210° C. for about 2-3 hours. For polyester, the preferred curing may be at a cure temperature of about 150° C. to about 170° C. for not less than about 4 hours. For high temperature novolac epoxy, the preferred curing may be at a cure temperature of about 150° C. to about 170° C. for not less than about 4 hours.

At S7, after the curing, the plurality of copper coils 106 may be stacked in a rotor slot 104 between the slot cell insulation 110; and, at S8, after the stacking, a wedge 114 may be inserted at the open end 116 of the rotor slot 104.

It will be appreciated by a person skilled in the art, that the method presented herein may be used for rewinding the copper coils of a generator. The copper coils of a generator may be unassembled, cleaned, and, before being rewound on the rotor, may be treated as described herein.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A method of preparing a field coil winding assembly, comprising:
   cleaning a plurality of copper coils;
   developing, after the cleaning, a copper oxide layer on each of the copper coils by oxidizing each of the copper coils in a solution;
   rinsing, after the developing, each of the copper coils;
   drying, after the rinsing, each of the copper coils;
   applying, after the drying, a turn insulation system to each of the copper coils, wherein the turn insulation system includes a turn insulation and an adhesive, wherein the turn insulation includes at least one of a glass fiber re-enforced polyamideimide, a glass fiber re-enforced polyester, or a glass fiber re-enforced high temperature novolac epoxy;
   curing, after the applying, each of the copper coils with the turn insulation system; and
   stacking the plurality of copper coils with the turn insulation system in each of a plurality of rotor slots in a rotor.

2. The method of claim 1, wherein the cleaning is performed using an alkaline detergent.

3. The method of claim 1, wherein the solution contains one of sodium chlorite, sodium hydroxide, trisodium phosphate, and deionized water.

4. The method of claim 1, wherein a duration of the developing is a period of time of about 4 to about 45 minutes.

5. The method of claim 1, wherein a solution temperature of the solution is in a range of about 45° C. to about 70° C.

6. The method of claim 1, wherein a thickness of the copper oxide layer is in a range of about 150 nm to about 5 microns.

7. The method of claim 1, wherein the rinsing comprises rinsing with water followed by rinsing with deionized water.

8. The method of claim 7, wherein the water has a water temperature of about 25° C. to about 50° C.

9. The method of claim 1, wherein the adhesive has a temperature index of at least 130° C.

10. The method of claim 1, wherein the adhesive is at least one of a one part Bisphenol-A-based epoxy, a polyamideimide, a polyester, or a high temperature novolac epoxy.

11. The method of claim 10, wherein the curing is at a cure temperature of about 90° C. to about 120° C. for not less than about 4 hours for the one part Bisphenol-A-based epoxy, about 180° C. to about 210° C. for about 2-3 hours for the polyamideimide, about 150° C. to about 170° C. for not less than about 4 hours for the polyester, or about 150° C. to about 170° C. for not less than about 4 hours for the high temperature novolac epoxy.

12. The method of claim 1, wherein the turn insulation includes at least one of a glass fiber re-enforced novolac epoxy, a glass fiber re-enforced polyamideimide, a glass fiber re-enforced polyester, or a glass fiber re-enforced high temperature novolac epoxy.

13. A method, comprising:
    cleaning a plurality of copper coils;
    developing, after the cleaning, a copper oxide layer on the copper coils by oxidizing the copper coils in a solution;
    rinsing, after the developing, the copper coils;
    drying, after the rinsing, the copper coils;
    applying, after the drying, a turn insulation system to the copper coils, wherein the turn insulation system includes a turn insulation and an adhesive; and
    curing, after the applying, the copper coils with the turn insulation system.

14. The method of claim 13, wherein the cleaning is performed using an alkaline detergent.

15. The method of claim 13, wherein the solution contains one of sodium chlorite, sodium hydroxide, trisodium phosphate, and deionized water.

16. The method of claim 13, wherein a duration of the developing is a period of time of about 4 to about 45 minutes.

17. The method of claim 13, wherein a solution temperature of the solution is a range of about 45° C. to about 70° C.

18. The method of claim 13, wherein a thickness of the copper oxide layer is in a range of about 150 nm to about 5 microns.

19. The method of claim 13, wherein the adhesive is at least one of a one part Bisphenol-A-based epoxy, a polyamideimide, a polyester, or a high temperature novolac epoxy.

20. The method of claim 13, wherein the turn insulation includes at least one of a glass fiber re-enforced novolac epoxy, a glass fiber re-enforced polyamideimide, a glass fiber re-enforced polyester, or a glass fiber re-enforced high temperature novolac epoxy.

* * * * *